US007684465B1

United States Patent
Dabak et al.

(10) Patent No.: US 7,684,465 B1
(45) Date of Patent: Mar. 23, 2010

(54) FREQUENCY HOPPING COMMUNICATION PROTOCOL (75) Inventors: Anand G. Dabak, Plano, TX (US); Carl M. Panasik, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/507,134

(22) Filed: Feb. 18, 2000

Related U.S. Application Data (60) Provisional application No. 60/177,557, filed on Jan. 21, 2000.

(51) Int. Cl.
*H04B 1/00* (2006.01)
(52) U.S. Cl. ...................................... 375/133
(58) Field of Classification Search ................ 375/132, 375/133, 134, 135, 136, 137, 140, 141, 142, 375/259, 260, 285, 295, 316, 365–366; 370/252, 370/321, 322, 329, 332–333, 337, 347, 433, 370/467; 455/452.1, 452.2
See application file for complete search history.

(56) References Cited

U.S. PATENT DOCUMENTS

| 4,752,939 | A  | * | 6/1988  | Amoroso et al. | ............ | 375/134 |
| 5,428,647 | A  | * | 6/1995  | Rasky et al.   | ................. | 375/366 |
| 5,509,027 | A  | * | 4/1996  | Vook et al.    | ................... | 375/134 |
| 6,118,805 | A  | * | 9/2000  | Bergstrom et al. | .......... | 375/132 |
| 6,400,751 | B1 | * | 6/2002  | Rodgers        | ...................... | 375/132 |
| 6,417,738 | B1 | * | 7/2002  | Lautzenhiser   | ................. | 331/17  |
| 6,501,785 | B1 | * | 12/2002 | Chang et al.   | ................. | 375/133 |
| 6,519,460 | B1 | * | 2/2003  | Haartsen       | ...................... | 455/452 |
| 6,574,266 | B1 | * | 6/2003  | Haartsen       | ...................... | 375/133 |
| 6,590,928 | B1 | * | 7/2003  | Haartsen       | ...................... | 375/134 |
| 6,603,799 | B1 | * | 8/2003  | Hlasny         | ........................ | 375/132 |

FOREIGN PATENT DOCUMENTS

| EP | 0 621 707 A    | 10/1994 |
| WO | WO 99 09671 A  | 2/1999  |

* cited by examiner

*Primary Examiner*—Khanh C Tran
(74) *Attorney, Agent, or Firm*—Ronald O. Neerings; Wade J. Brady, III; Frederick J. Telecky, Jr.

(57) ABSTRACT

A Master-Slave Dwelling technique associated with modified Bluetooth hopping provides performance gains and extended ranges of operation for slow Doppler situations (slower than 1-3 Km/h). The Master and Slave make use of only the good frequencies (frequencies for which the channel is not in a fade due to Raleigh fading) over the Bluetooth transmission bandwidth.

33 Claims, 10 Drawing Sheets

The block diagram for the Master-Slave Dwelling technique is shown.

Figure 1: The block diagram for the Master-Slave Dwelling technique is shown.

Figure 2: The Master-Slave Dwelling (MSD) hopping pattern is shown for HV1 voice.

Figure 3: The Master-Slave Dwelling (MSD) hopping pattern is shown for slave 3, HV3 voice. Slaves 1, 2 use normal Bluetooth hopping frequencies.

FREQUENCY HOPPING COMMUNICATION PROTOCOL

This application claims priority under 35 USC §119 (e) (1) of Provisional Special Application No. 60/177,557, filed Jan. 21, 2000.

BACKGROUND OF THE INVENTION

1. Field of the Invention

This invention relates generally to the field of spread spectrum frequency hopping communication, and more particularly to an improved method of voice communication associated with the Bluetooth wireless communication protocol.

2. Description of the Prior Art

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. Id. pg. 31. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a $10^{th}$ century Scandinavian king who united several Danish kingdoms. This protocol also operates in the 2.4 GHz band and advantageously offers short-range wireless communication between Bluetooth devices without the need for a central network.

The Bluetooth protocol provides a 1 Mb/sec data rate with low energy consumption for battery powered devices operating in the 2.4 GHz ISM (industrial, scientific, medical) band. The current Bluetooth protocol provides a 10-meter range and an asymmetric data transfer rate of 721 kb/sec. The protocol supports a maximum of three voice channels for synchronous, CVSD-encoded transmission at 64 kb/sec. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scatternets." Typical Bluetooth master devices include cordless phone base stations, local area network (LAN) access points, laptop computers, or bridges to other networks. Bluetooth slave devices may to include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Spread-spectrum technology or frequency diversity with frequency hopping permits operation in noisy environments and permits multiple piconets to exist in close proximity. The frequency hopping scheme permits up to 1600 hops per second over 79 1-MHz channels or the entire ISM spectrum. Various error correcting schemes permit data packet protection by ⅓ and ⅔ rate forward error correction. Further, Bluetooth uses retransmission of packets for guaranteed reliability. These schemes help correct data errors, but at the expense of throughput.

A major impairment relating to wireless channels is associated with Rayleigh fading. Regarding typical indoor scenarios associated with Bluetooth applications, the channel delay (signal delay between when a signal is transmitted and when the transmitted signal is received) spread a can be shown to be about 50 nsec, implying that the Bluetooth ISM band looks frequency selective. Further, since the inverse of the delay spread σ is much less than the 1 Mb/sec symbol rate of Bluetooth, each channel will behave as a flat Raleigh fading channel. Although the Bluetooth protocol employs frequency hopping to provide for frequency diversity and as a means for providing robustness against noise/interference, the frequency hopping of Bluetooth does not exploit the full frequency diversity of the wide Bluetooth transmission bandwidth, particularly for voice applications.

In view of the foregoing discussion, a need exists in the wireless communications art for a modified spread spectrum frequency hopping scheme to better accommodate voice and data communications over the Bluetooth ISM band.

SUMMARY OF THE INVENTION

The present invention is directed to a Master-Slave Dwelling (MSD) technique to modify Bluetooth hopping frequencies so that the true frequency diversity of the Bluetooth protocol can be more fully exploited, particularly for voice communications. A synchronous connection oriented (SCO) link with voice applications is now considered for simplicity; although a similar extension can be made to asynchronous connectionless (ACL) links. Further, very low (much slower than walking speeds) Doppler speeds are assumed, which implies that the channel is basically static over time.

The MSD technique starts from the state wherein the Master and Slave are communicating to each other on an SCO link using the normal Bluetooth hopping frequencies. Based upon the Slave to Master transmission, the Master keeps a record of the best frequencies, i.e. those frequencies exhibiting good signal correlation characteristics, low numbers of retransmissions, low BER and the like. Signals generated at these frequencies will have the least path loss or least interference from other sources, like microwave ovens, etc. Then, at some point in time, the Master communicates to the Slave that after N packets, the Master and Slave should use the frequency $f_i$ in their communication for a time $T_i$ (instead of the normal Bluetooth hopping frequencies over time $T_i$). The time $T_i$ would depend upon the environment, i.e. how fast the environment is changing due to Doppler, etc., and will always be less than the FCC allowed time of 0.4 seconds that a frequency hopping system can dwell on a given frequency. The Master repeats this message in its consecutive transmissions to the Slave. Due to the multiple re-transmissions of the same message, it is highly likely that the Slave will receive the message successfully. Thus, after N packets, the Master and slave would dwell on a frequency $f_i$ for time $T_i$ for their future packet transmissions. After time $T_i$, the Master and Slave would return to the normal Bluetooth hopping frequencies. The foregoing procedure would then be continually repeated as long as the Master and Slave continue to communicate with one another.

One preferred embodiment of the present Master-Slave Dwelling technique comprises:

scanning a plurality of frequency channels;

measuring signal characteristics associated with each scanned channel;

comparing the measured signal characteristics with predetermined signal characteristics to determine whether a channel demonstrates insufficient signal characteristics and further to determine which channels demonstrate acceptable signal characteristics; and causing communication between the Master and at least one Slave to dwell on a selected channel frequency for a predetermined period of time associated with a plurality of data packets, the selected channel frequency associated with a channel demonstrating acceptable signal characteristics, the dwell frequency displacing a channel frequency associated with a channel demonstrating insufficient signal characteristics.

Another preferred embodiment of the present Master-Slave Dwelling technique comprises:

scanning a plurality of Bluetooth frequency channels; measuring signal characteristics associated with each Bluetooth frequency channel;

generating control signals associated with the measured signal characteristics; and controlling a frequency synthesizer via the control signals such that a Master and at least one Slave will dwell on a selected Bluetooth channel frequency for a predetermined period of time, the selected channel frequency associated with a channel demonstrating desirable signal characteristics, the selected Bluetooth channel frequency displacing a Bluetooth channel frequency exhibiting undesirable signal characteristics, wherein the predetermined period of time is associated with a plurality of data packets.

Yet another preferred embodiment of the present Master-Slave Dwelling technique comprises:

scanning a plurality of frequency channels;

measuring signal characteristics associated with each frequency channel;

generating control signals associated with the measured signal characteristics; and controlling a Master-Slave communication protocol via the control signals such that the communication protocol will alternate between a standard Bluetooth frequency channel hopping sequence and a modified Bluetooth hopping sequence, the modified Bluetooth hopping sequence determined from the measured signal characteristics.

Still another preferred embodiment of the present Master-Slave Dwelling technique comprises:

scanning a plurality of frequency channels;

measuring signal characteristics associated with each scanned channel;

comparing the measured signal characteristics with predetermined signal characteristics to determine which channels demonstrate insufficient signal characteristics and further to determine which channels demonstrate acceptable signal characteristics; and causing communication between the Master and at least one Slave to dwell on at least one selected channel frequency, each selected channel frequency associated with an adjustable period of time associated with a plurality of data packets to establish a frequency dwell protocol, each at least one selected channel frequency associated with a channel demonstrating acceptable signal characteristics, each dwell frequency displacing a channel frequency associated with a channel demonstrating insufficient signal characteristics.

A wireless communication system suitable for implementing a Master-Slave Dwelling technique according to one preferred embodiment of the present invention comprises:

a Master communication device configured to communicate with at least one Slave device via a predetermined communication protocol, comprising:

a data processor;

an algorithmic software directing the data processor; and a data storage unit, wherein discrete frequency channel data is stored and supplied to the data processor such that the data processor, directed by the algorithmic software, can automatically determine frequency channel parameters using algorithmically defined relationships among the discrete frequency channel data and thereby cause the Master communication device to modify the predetermined communication protocol.

Another wireless communication system suitable for implementing a Master-Slave Dwelling technique according to one preferred embodiment of the present invention comprises:

at least one Slave device in communication with a Master communication device, wherein the Slave device comprises:

a data processor;

an algorithmic software directing the data processor; and a data storage unit, wherein discrete frequency channel data is stored and supplied to the data processor such that the data processor, directed by the algorithmic software, can automatically determine frequency channel parameters using algorithmically defined relationships among the discrete frequency channel data and thereby cause the Master communication device to modify the predetermined communication protocol.

The present invention thus provides various technical advantages. In one aspect of the invention, a Master-Slave Dwell modified frequency hopping technique provides a communication protocol having improved data throughput and range expansion over normal Bluetooth hopping techniques.

In another aspect of the invention, a Master-Slave Dwell modified frequency hopping technique provides a communication protocol suitable for implementation in association with Bluetooth Modified Hopping (BMH) such as disclosed in U.S. patent application entitled Beam Forming For Transmit Using Bluetooth Modified Hopping Sequences (BFT-BMH), by Dabak et al., filed Jan. 24, 2000, and/or normal Bluetooth hopping to reduce packet error rates achievable using BMH alone or in combination with normal Bluetooth hopping.

In yet another aspect of the invention, a Master-slave Dwell modified frequency hopping technique provides a communication protocol that more fully exploits the full frequency diversity of the wide Bluetooth transmission bandwidth, particularly for voice applications.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Bluetooth employs frequency hopping to provide for frequency diversity and robustness against various types of interference as stated herein above. One major impairment in the wireless channel regards Rayleigh fading, also discussed above. The channel delay spread σ is about 50 nsec, implying the channel looks frequency selective over the Bluetooth bandwidth for typical Bluetooth applications involving indoor scenarios. Further, since the inverse of the delay spread is much less than the 1 Mb/sec symbol rate of Bluetooth, the channel acts like a flat Rayleigh fading channel. The frequency diversity of frequency hopping is most useful for data type applications wherein ARQ based retransmission ensures high throughput. Regarding Bluetooth voice applications, the only effect of this hopping is to make the channel appear like a fast fading channel. The packet error rate (PER), however, for voice will still correspond to that of a single path Rayleigh fading channel. Thus, in some sense, the frequency hopping of Bluetooth does not exploit the full frequency diversity of the wide ISM band, particularly for voice applications.

In view of the above, use of solely good frequencies, i.e. frequencies for which the channel is not in a fade, over the ISM band, will significantly improve Bluetooth performance. Choosing these good frequencies, for example, to accommodate Bluetooth communication would correspond to a form of selection diversity over a number of Rayleigh fading independent channels. Thus, the true frequency diversity inherent in the Bluetooth frequency hopping protocol would be exploited.

Further, Rayleigh fading appears very different at physical locations separated by a distance greater than λ/2 (6.25 cm) for an indoor environment. Hence, a Master-Slave pair in one piconet for a given frequency may have very different path loss characteristics as compared to another Master-Slave pair in an adjoining piconet.

Federal Communications Commission (FCC) regulation part 15.247 prescribes that ISM band transmissions do not interfere with one another. One common method to prevent such interference is to set up frequency hopping (75 channels out of 83) and to use only 1-MHz for the communication bandwidth. The quasi-random hopping events insure that there is little collision of wireless packets. In Bluetooth, this scheme breaks down (basically a grid lock) when there are seven Masters in the same environment. The collisions are continual. In fact, in a given environment, after the first link, all additional links are degraded.

Present DSP technology is capable of providing smart frequency hoppers. This technology was not available when the foregoing FCC regulations were written. In fact, smart hopping was prohibitively expensive when the foregoing FCC regulations were written.

The present Master-Slave Dwelling (MSD) technique implements a 'smart', self-cooperating system wherein each link is capable of selecting one or a few of the best frequency channels for operation and therefore enable significant increases in the aggregate data rate for a multi-link environment. At the same time, since the environment changes slowly as a function of time, the present MSD technique continues to provide equal use of frequencies on average as seen by other links in the same environment.

Figure 10:
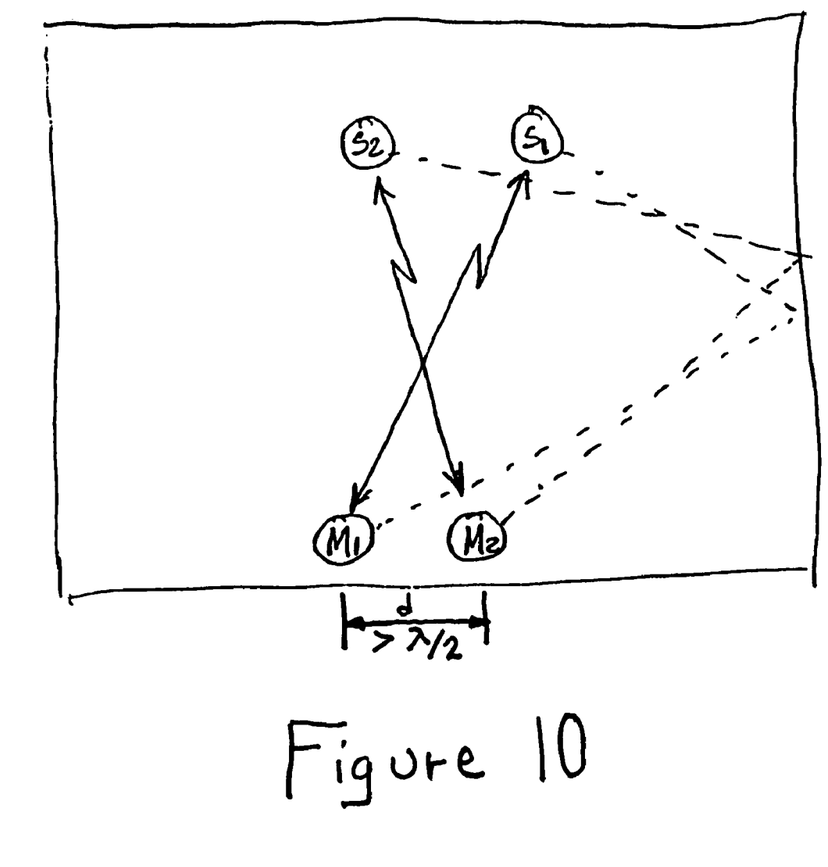
FIG. 10 illustrates a pair of communication links associated with two sets of Master-Slave devices (M1-S1, M2-S2) in a local multi-link environment.

FIG. 10 illustrates two links in the same environment utilizing the present MSD technique. The propagation path on each link can be seen to be different for devices M1, M2 and S1, S2 which are not co-located. The local environment (multipath rich), for example, is seen by the two links as nearly orthogonal when the devices M1 and M2 (or S1 and S2) are co-located more than one-half wavelength apart. In contrast, the Bluetooth specification discussed herein above anticipates that Bluetooth devices are much further apart due to receiver/transmitter interference (radio) issues.

Figure 11:
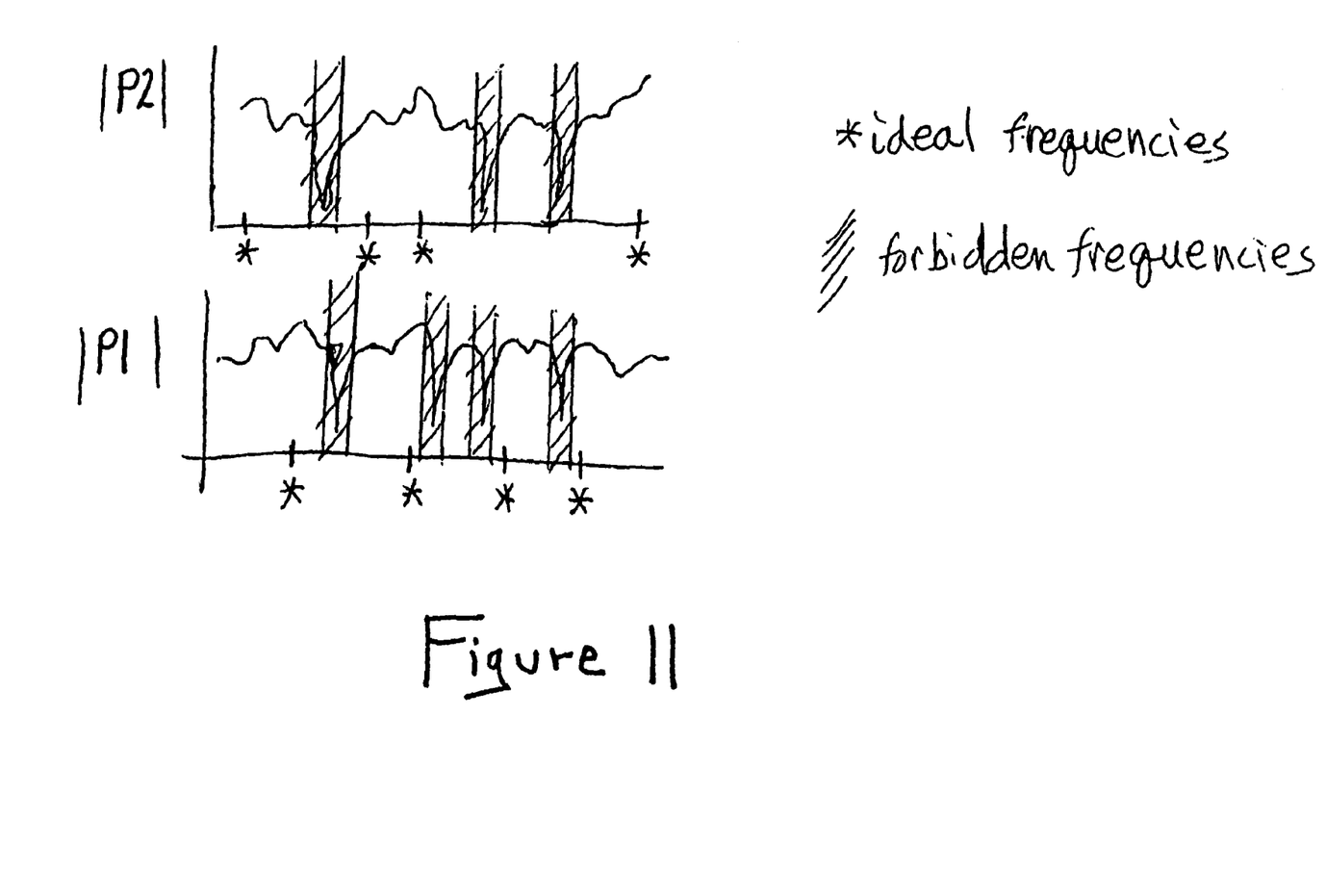
FIG. 11 illustrates a frequency response spectrum for each of the two communication links P1, P2 depicted in FIG. 10.

One 'smart' method of quasi-coordinating communications within an indoor environment such as depicted in FIG. 10 is to utilize the present MSD technique with a few modifications to particular parameters as discussed herein in further detail below. This would be the case, for example, if the chosen frequencies were to be limited in number. The indoor environment such as depicted in FIG. 10 and discussed in further detail herein below nominally has 4 Raleigh fading channels yielding 4 nulls and 4 peaks over the ISM communication band. These nulls and peaks depicted in FIG. 11, are a function of the environment and the position of the Master M1, M2 and Slave S1, S2 in that environment. Therefore, the propagation loss as a function of frequency is different for each link P1, P2 corresponding to the M1-S1 and M2-S2 communication link respectively. The present Master-Slave Dwelling (MSD), described with reference to the embodiments shown in the figures discussed herein, while finding the good frequencies in each piconet, would thus allow a very efficient spectral usage since identification of the above 4 nulls and 4 peaks would allow the two links to settle upon a set of orthogonal frequencies in which the links could optimally utilize the (shared) spectral environment.

Only a synchronous connection oriented (SCO) link with voice applications is considered in the instant discussion to preserve clarity and brevity. The present invention is not so limited however, and it shall be understood that a similar extension can be made to asynchronous connectionless (ACL) links. Further, Doppler speeds are assumed to be very low (much slower than walking speeds), which implies the channel is basically static over time.

Figure 1:
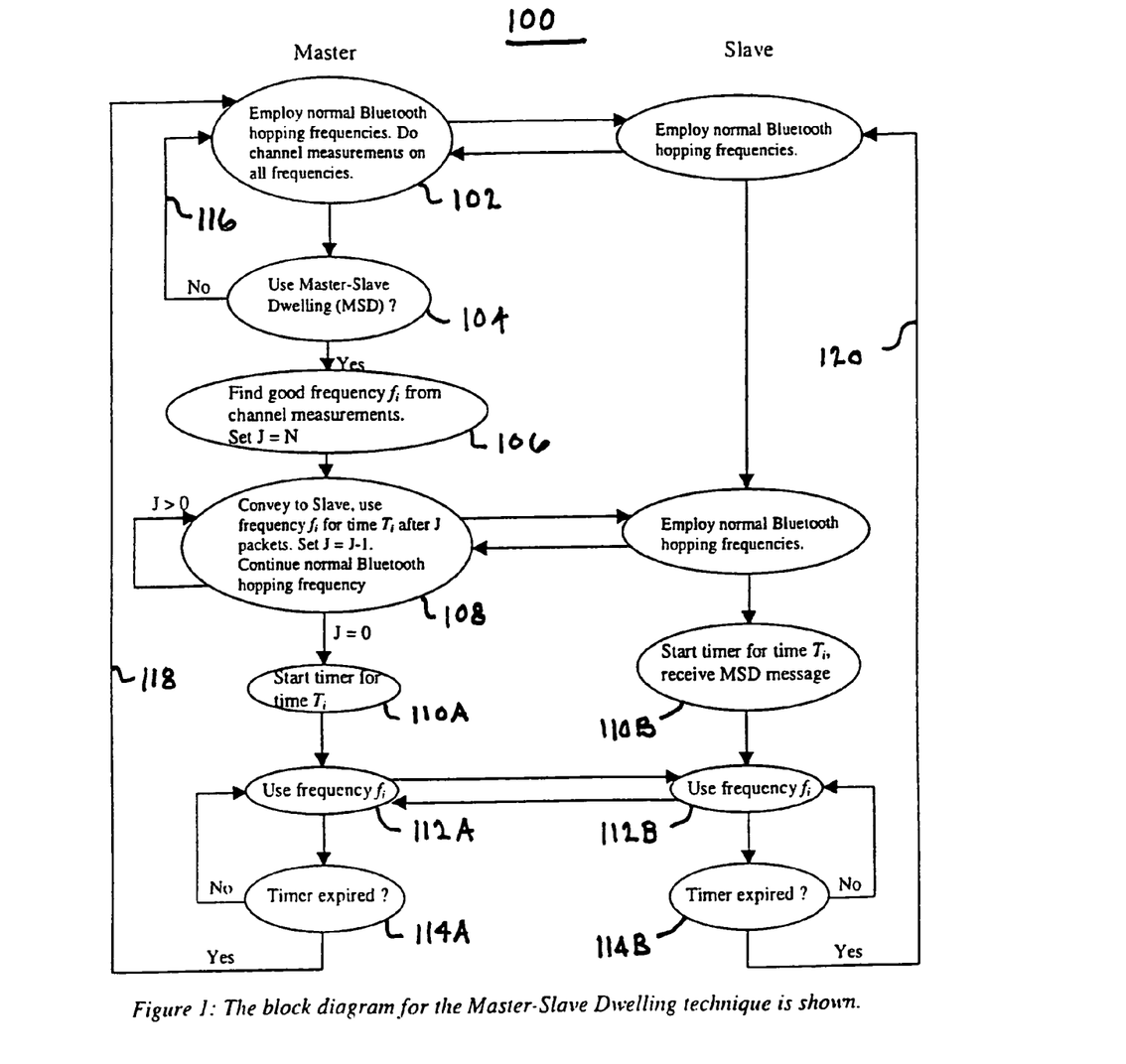
FIG. 1 is a flow chart illustrating a Master-Slave Dwelling technique according to one preferred embodiment of the present invention.

Looking now at FIG. 1, a flow chart 100 illustrates a Master-Slave Dwelling frequency hopping technique according to one preferred embodiment of the present invention. The Master-Slave Dwelling technique starts from the state wherein the Master and Slave are communicating to each other on an SCO link using the normal Bluetooth hopping frequencies as shown in step 102. Also seen in step 102, the Master performs measurements on all frequencies regarding path loss characteristics between the Master and the Slave to determine the channels with least interference from other sources, e.g. other Bluetooth links, microwave ovens and the like. The path loss characteristics are evaluated to determine if Master-Slave Dwelling should be implemented, as shown in step 104. MSD would, of course, be implemented if the Master has determined that one or more frequencies are not effectively providing error-free transmissions to the Slave(s), i.e. the transmissions must be repeated numerous times to ensure accurate communications. Based upon the Slave to Master transmission(s), the Master keeps a record of the best frequencies, i.e. frequencies with least path loss or least interference from other sources, as seen in step 106. This record is used by the Master to determine a number N of communication packets to transmitted (also seen in step 106), after which the Master and Slave should then use the frequency $f_i$ in their communications for a time $T_i$ (instead of the normal Bluetooth hopping frequencies over time $T_i$) as depicted in step 108. A loop counter, depicted as J=N is initialized in step 106 and is decremented by one (J=J−1) following each transmitted packet as shown in step 108 to keep a record of transmitted communication packets. Normal Bluetooth hopping frequencies are used until the loop counter times out (J=0). Following transmission of the N data packets, both the Master and Slave implement their respective timers for time $T_i$ as shown in steps 110A, 110B. All further communications between the Master and the Slave are then performed at the dwell frequency $f_i$ as depicted in steps 112A, 112B, until their respective timers have timed out as shown in steps 114A, 114B. The timers shown in steps 110A and 110B determine the amount of time that the Master and Slave will dwell at the frequency $f_i$ before returning again to the normal Bluetooth hopping frequencies via loops 118 and 120. During all communications between the Master and Slave however, the Master is continuously in a loop to perform channel measurements on all frequencies, as stated above such that the Master-Slave Dwelling process can be repeated indefinitely so long as the Master and Slave are in communication with one another. Further, the channel measurements may indicate that communications between the Master and Slave during any particular dwell time period may have somehow been adversely affected because of a new source of unforeseen interference. Such a situation would then prompt the Master to abandon the prescribed Master-Slave Dwelling process before the time period $T_i$ has elapsed, and return to normal Bluetooth hopping. If either the Master or Slave do not receive packets during time period $T_i$ once they have entered the dwelling mode, for example, they will return to the normal Bluetooth hopping protocol. The loop is depicted as element 116 in FIG. 1. Although the Master-Slave Dwelling process can be repeated indefinitely, the actual time allotted for dwelling at any specific channel frequency is limited by the Master timer 114A and/or respective Slave timer 114 B as stated above. The Master timer 114A or Slave timer 114B then ensure that any channel frequency dwell time can not exceed 0.4 seconds within any 30 second time period in accordance with Federal Communication Commission standards by again employing normal Bluetooth hopping frequencies as depicted by loop elements 118 and 120 respectively. Most preferably, the Master software modifies the time period $T_i$ to ensure all frequencies are used equally on average.

Figure 2A:
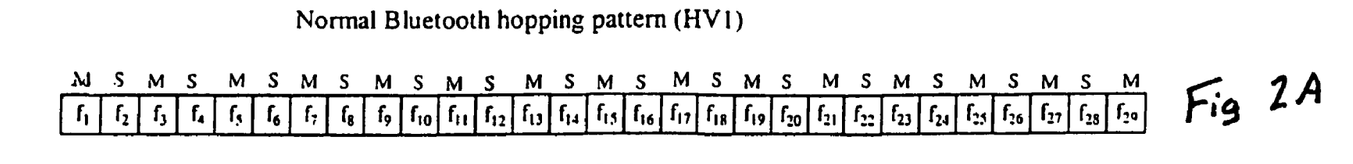
FIG. 2 is a Master-Slave Dwelling hopping pattern such as might be seen when using HV1 voice (High-quality Voice transmission for a single active slave device)
Figure 2B:
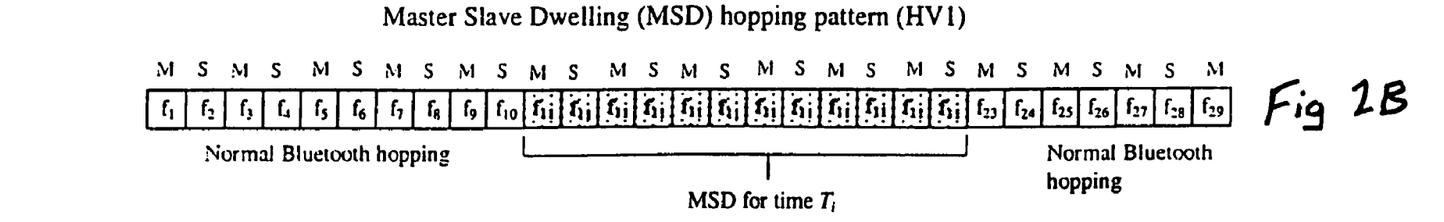

FIG. 2 illustrates a Master-Slave Dwelling hopping pattern such as might be seen when using HV1 voice (High-quality Voice transmission for a single active slave device) in combination with one embodiment of the present invention. The present invention is not so limited however, and it shall be understood that FIG. 2 is used herein solely for exemplary purposes. The upper FIG. 2A illustrates a normal Bluetooth hopping pattern wherein the Master communicates to a Slave at a different frequency for each successive packet. Alternatively, other systems (e.g., IEEE 802.11) transmit a first set of packets at a first frequency, and then hop to a second frequency to transmit a second set of packets, and so forth for numerous different sets of packets at numerous different respective frequencies. FIG. 2B illustrates a MSD hopping pattern according to one embodiment of the present invention. The Master has determined that MSD should commence following transmission of 10 packets starting at frequency f1 and ending with frequency f10. Thus, for a period of time $T_i$, Master-Slave communications will dwell at frequency f11 (MSD for time $T_i$). Normal Bluetooth hopping is again implemented at frequency f23 which is the first hopping frequency used by the Master following the MSD.

Figure 3A:
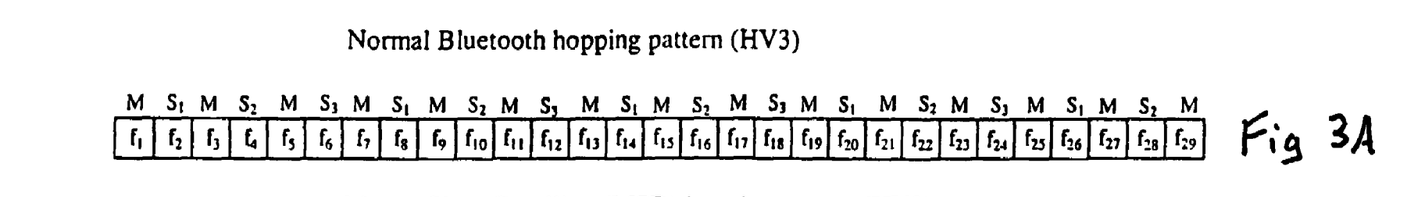
FIG. 3 is a Master-Slave Dwelling hopping pattern such as might be seen when using HV3 voice (High-quality Voice transmission for three active slave devices)
Figure 3B:
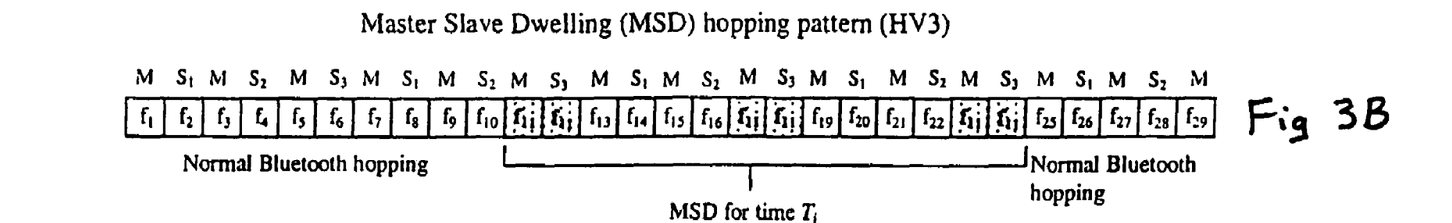

FIG. 3 is a Master-Slave Dwelling hopping pattern such as might be seen when using HV3 voice (High-quality Voice transmission for three active slave devices) in combination with one embodiment of the present invention. Again, the present invention is not so limited however, and it shall be understood that FIG. 3 is also used herein solely for exemplary purposes. The upper FIG. 3A illustrates a normal Bluetooth hopping pattern wherein the Master communicates to three different Slaves, S1, S2 and S3, at a different frequency for each successive packet. As stated above, other systems (e.g., IEEE 802.11) may transmit a first set of packets at a first frequency, and then hop to a second frequency to transmit a second set of packets, and so forth for numerous different sets of packets at numerous different respective frequencies. FIG. 3B illustrates another MSD hopping pattern according to one embodiment of the present invention. The Master has determined that MSD should commence between the Master and the Slave S3 following transmission of 10 packets starting at frequency f1 and ending with frequency f10. Thus, for a period of time $T_i$, any Master-Slave communications that occur between the Master and Slave S3, will dwell at frequency f11 (MSD for time $T_i$). Normal Bluetooth hopping is again implemented at frequency f25 which is the first hopping frequency used by the Master following the MSD. During the time $T_i$, it can be seen that all communications between the Master and Slaves 1 and 2 will continue using the normal Bluetooth hopping pattern, even though MSD is being used between the Master and Slave 3. This scenario assumes that no bad communication frequencies were found by the Master during its communications with Slaves 1 and 2, and that significant Rayleigh fading was found only during communications between the Master and Slave 3.

Remembering that the typical indoor delay spread σ is 50 nsec, as stated herein before; the channel correlation as a function of frequency separation Δf is given in equation 1.5.20 in the Jakes book on microwave Mobile communications, IEEE Press, 1974 as:

$$\text{corr}(\Delta f) = 1/[1+(2\pi\Delta f\sigma)^2]^{1/2} \quad (1)$$

This implies that two channels separated by a frequency of 20 MHz become more or less uncorrelated for a 50 nsec delay spread. The Bluetooth bandwidth is 78 MHz. Hence, the number of independent Rayleigh fading channels will approximately be 78/20~4. The present MSD technique would therefore have the performance of a selection diversity scheme over 4 independent Rayleigh fading channels for a static channel not varying rapidly. The performance of the MSD technique is compared to normal Bluetooth hopping in FIGS. 4 and 5 for HV1 and HV3 voice respectively.

Figure 4:
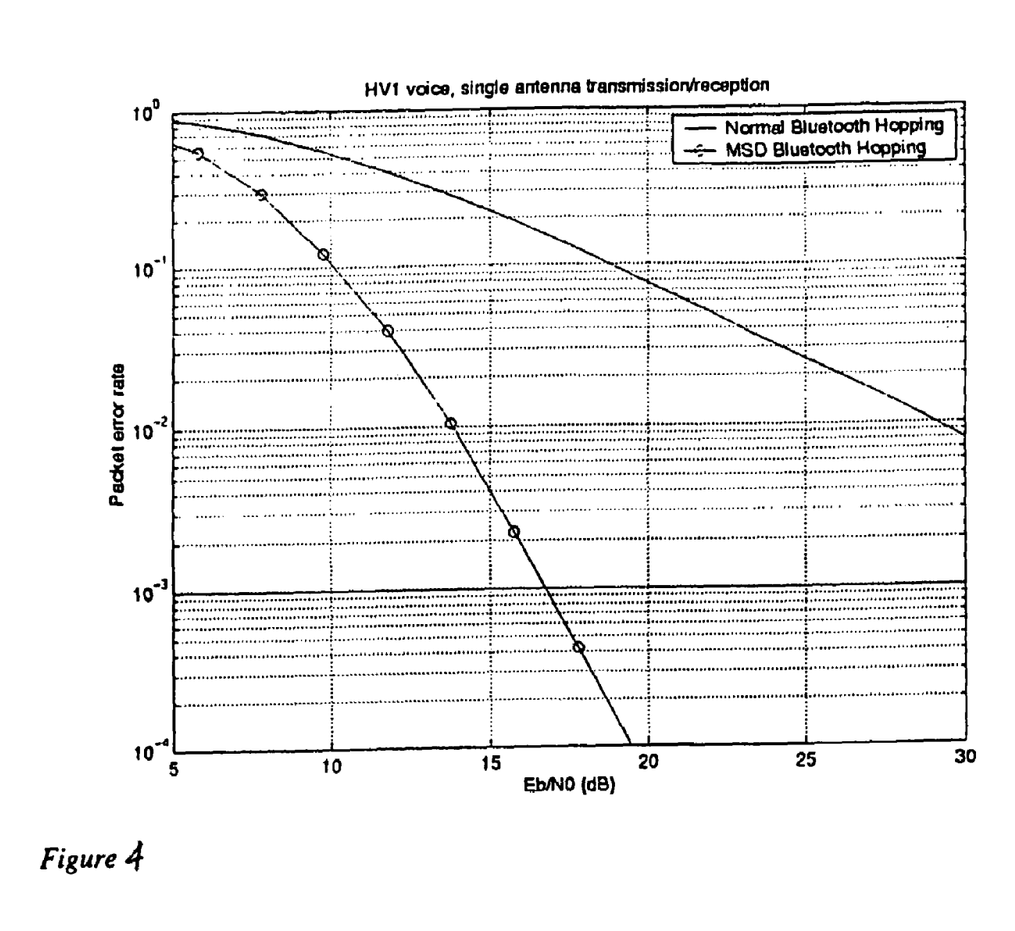
FIG. 4 is a graph comparing Master-Slave Dwelling performance with normal Bluetooth hopping performance for HV1 voice using a single antenna.

FIG. 4 is a graph comparing Master-Slave Dwelling performance with normal Bluetooth hopping performance for HV1 voice using a single antenna. The MSD technique can be seen to provide about 15 dB of gain over normal Bluetooth hopping for a desired packet error rate of 1%.

Figure 5:
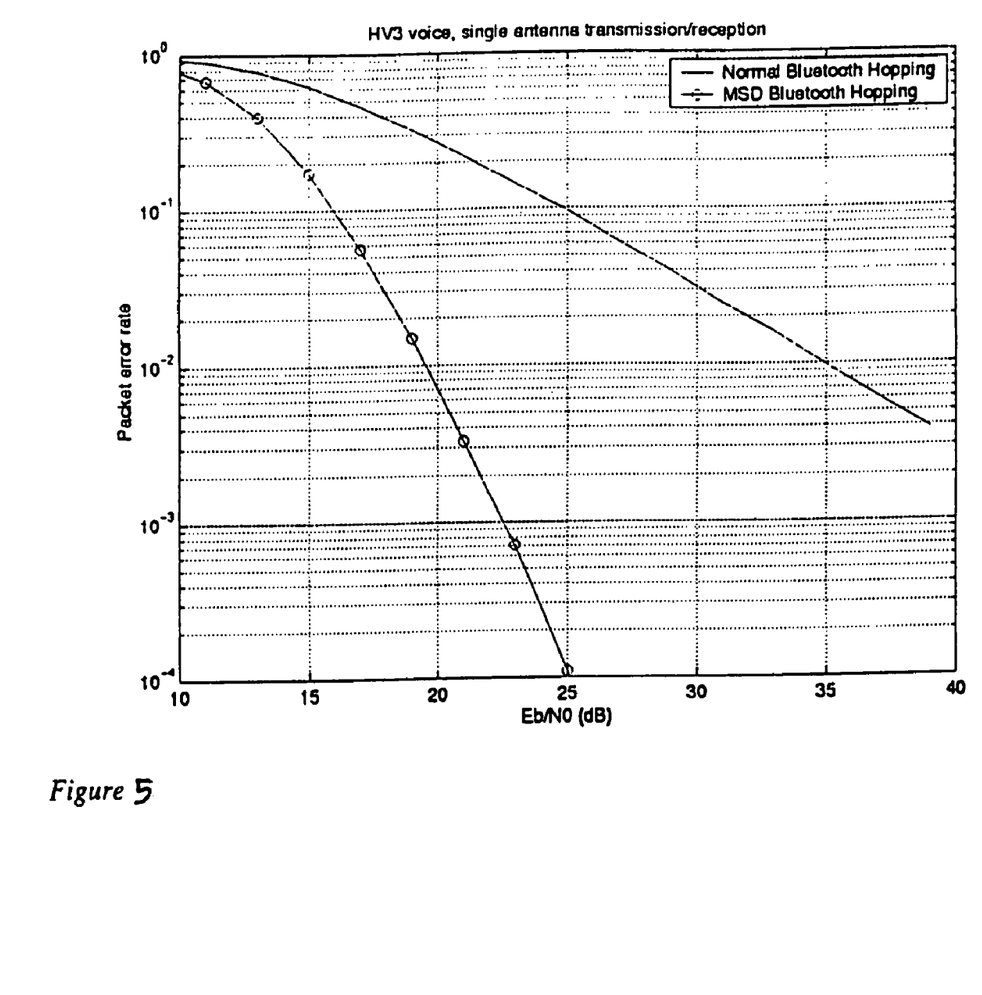
FIG. 5 is a graph comparing Master-Slave Dwelling performance with normal Bluetooth hopping performance for HV3 voice using a single antenna.

FIG. 5 is a graph comparing Master-Slave Dwelling performance with normal Bluetooth hopping performance for HV3 voice using a single antenna. Again, as with HV1 voice, the MSD technique can be seen to provide about 15 dB of gain over normal Bluetooth hopping for a desired packet error rate of 1%. The performance gains of the present MSD technique are summarized in Table 1 below in terms of the SNR gains and in terms of the extended range possible over normal Bluetooth hopping.

TABLE 1

| MSD gains over normal Bluetooth hopping | SNR gains in dB | Extended range over normal Bluetooth hopping |
|---|---|---|
| HV1 voice | 15 dB | 3.1× |
| HV3 voice | 15 dB | 3.1× |

Table 1 shows that an extended range of about 3.1 times is possible for MSD over the normal Bluetooth hopping. Thus, if the normal Bluetooth range is 10 meters, the MSD range is 31 meters, a significant advancement in the art.

Bluetooth Modified Hopping (BMH) frequencies, discussed herein above, have been shown to yield excellent performance gains over normal Bluetooth hopping frequencies in the presence of two antennas for reception and transmission. U.S. patent application entitled Beam Forming For Transmit Using Bluetooth Modified Hopping Sequences (BFTBMH), by Dabak et al., filed Jan. 24, 2000, assigned to Texas Instruments Incorporated, the assignee of the present invention, provides a more detailed description of BMH frequencies and associated technology, and is incorporated by reference herein in its entirety. The BMH frequencies are more useful when the environment is changing fairly fast, on the order of 1-3 km/hour corresponding to walking speeds. Thus, when the environment is more or less stationary, the present MSD technique can also be employed to improve multiple antenna reception/transmission. In that regard, the MSD technique(s) associated with multiple antenna reception and transmission are substantially identical with that shown in FIGS. 1 and 2, discussed above. The performance of the present MSD technique using two antennas for reception and transmission using simple switched transmit diversity (STD) is illustrated in FIGS. 6 and 7 for HV1 and HV3 voice respectively.

Figure 6:
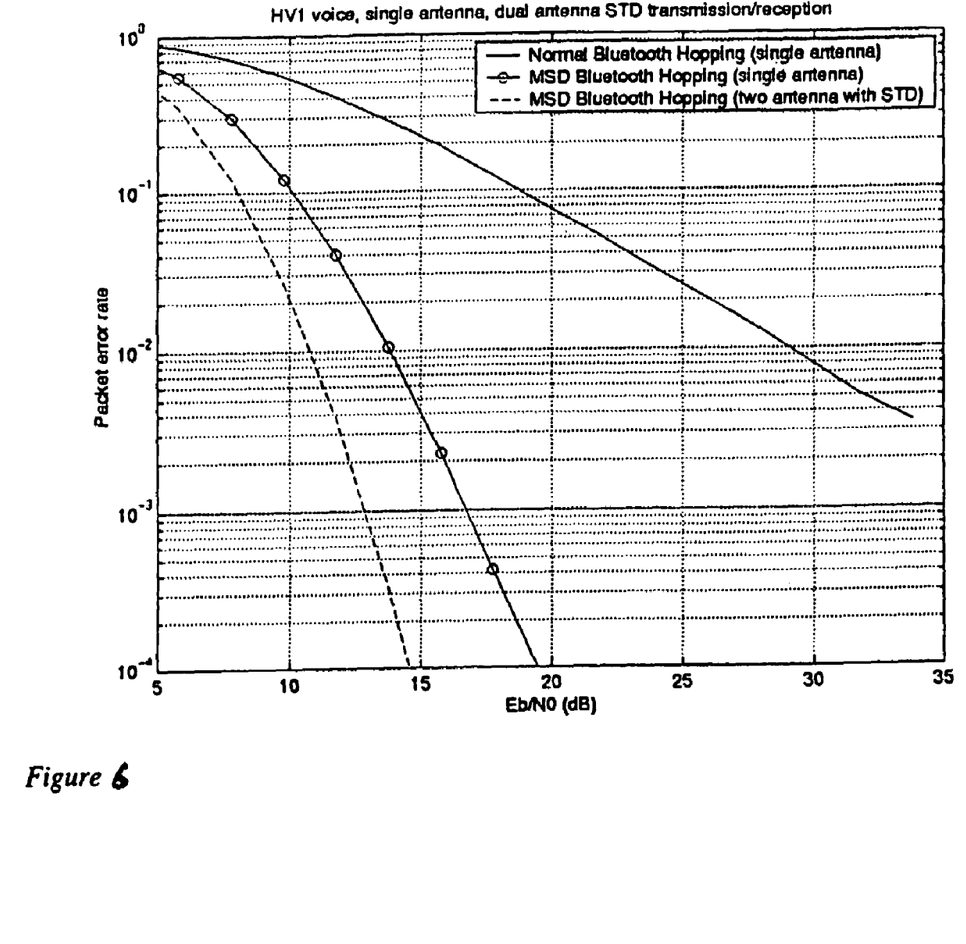
FIG. 6 is a graph comparing MSD performance using a single antenna and MSD performance using a dual antenna with normal Bluetooth hopping performance using a single antenna for HV1 voice.

FIG. 6 is a graph comparing MSD performance using a single antenna with MSD performance using a dual antenna and with normal Bluetooth hopping performance using a single antenna for HV1 voice. The MSD technique using a dual antenna scheme can be seen to provide about 18 dB of gain over the normal Bluetooth hopping scheme and a 3 dB gain over the MSD technique using a single antenna scheme, for a desired packet error rate of 1%.

Figure 7:
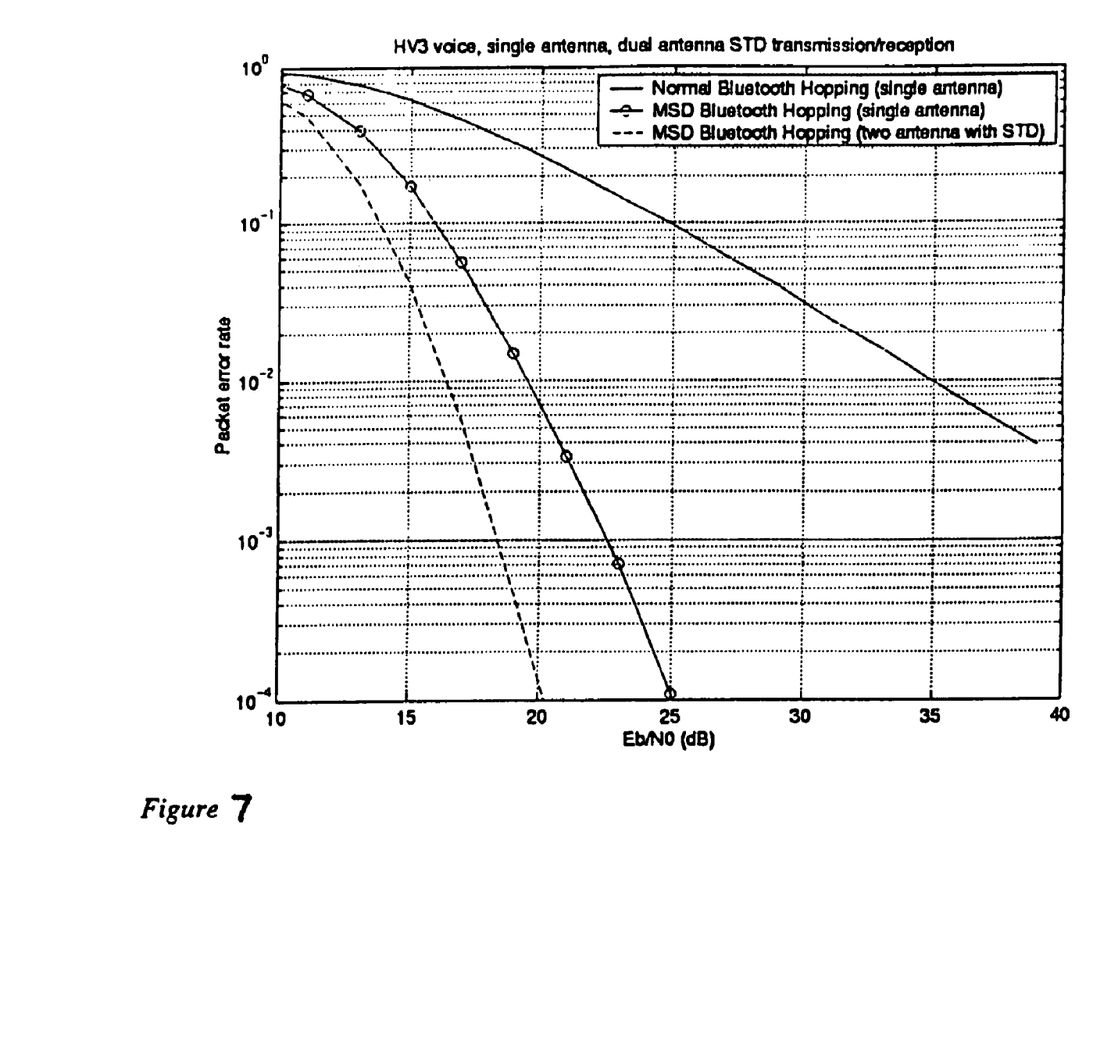
FIG. 7 is a graph comparing MSD performance using a single antenna and MSD performance using a dual antenna with normal Bluetooth hopping performance using a single antenna for HV3 voice.

FIG. 7 is a graph comparing MSD performance using a single antenna with MSD performance using a dual antenna and with normal Bluetooth hopping performance using a single antenna for HV3 voice. Again, as with HV1 voice, the MSD technique using a dual antenna scheme can be seen to provide about 18 dB of gain over normal Bluetooth hopping and about 3 dB of gain over MSD with a single antenna, for a desired packet error rate of 1%. The performance gains of the present MSD dual antenna technique are summarized in Table 2 below in terms of the SNR gains and in terms of the extended range possible over normal Bluetooth hopping and MSD using a single antenna.

TABLE 2

| | MSD dual antenna w/STD gains over single antenna normal Bluetooth hopping | | MSD dual antenna w/STD gains over MSD w/single antenna | |
|---|---|---|---|---|
| | SNR gains (dB) | Gains in extended range | SNR gains (dB) | Gains in extended range |
| HV1 voice | 18 dB | 4.0× | 3 dB | 1.3× |
| HV2 voice | 18 dB | 4.0× | 3 dB | 1.3× |

Table 2 shows that an extended range of about 4.0 times is possible for dual antenna MSD over the single antenna normal Bluetooth hopping scheme. Thus, if the single antenna normal Bluetooth range is 10 meters, the dual antenna MSD range is 40 meters, again being a significant advancement in the art. Further, dual antenna MSD provides an extended range of about 1.3 times that possible with single antenna MSD.

In summary explanation of the above, the Master-Slave Dwelling techniques presented herein effectively advance the presently known art associated with spread spectrum frequency hopping communication techniques. Specifically, for single antenna transmission, the present MSD technique provides about 15 dB of performance gain over normal Bluetooth hopping, yielding an extended range of 3 times the normal Bluetooth range. Further, the present MSD technique provides about 18 dB of performance gain over normal Bluetooth hopping, yielding an extended range of 4 times the normal Bluetooth range. The present MSD technique is negotiated between the Master and the Slave, as described herein. Therefore, in higher Doppler situations (more than 1-3 Kmph), and in the presence of dual antennas, the Master-Slave can decide to employ Bluetooth Modified Hopping (BMH) frequencies instead. Table 3 below summarizes applications associated with MSD, BMH and normal Bluetooth hopping frequencies.

TABLE 3

| | Higher Dopplers (greater than 1-3 Kmph) | Low Dopplers (less than 1-3 Kmph) |
|---|---|---|
| Single antenna Rx/Tx | N | MSD |
| Dual antenna Rx/Tx | BMH | MSD/BMH |

Figure 8:
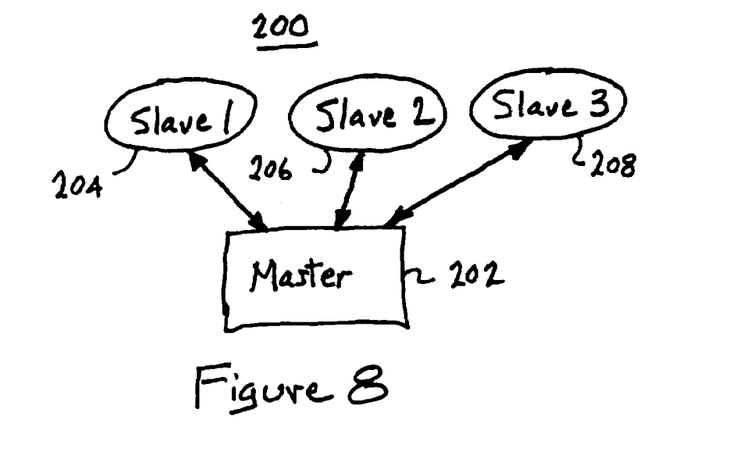
FIG. 8 is a simplified block diagram illustrating a typical piconet.

N: Normal Bluetooth Hopping
MSD: Master-Slave Dwelling Hopping
BMH: Bluetooth Modified Hopping FIG. 8 is a simplified block diagram illustrating a typical piconet 200. Piconet 200 can be seen to have a Master device 202 and a plurality of Slave devices 204, 206, 208. These devices communicate within the piconet 200 using standard Bluetooth hopping frequencies alone or in combination with modified Bluetooth hopping frequencies such as described herein above. Frequency diversity within the piconet 200 is accomplished by using at least one antenna in combination with the present Master-Slave Dwelling technique to achieve the desired communication performance characteristics as described above with reference to FIGS. 1-7.

Figure 9:
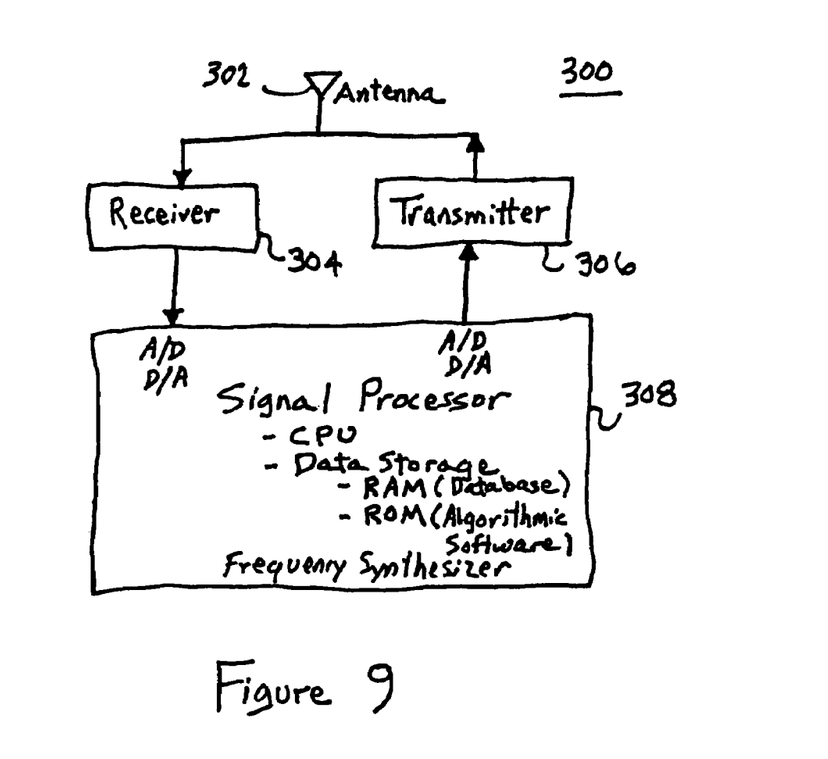
FIG. 9 is a simplified block diagram illustrating a Master/Slave communication system suitable for implementing a Master or Slave device according to one embodiment of the present invention.

FIG. 9 is a simplified block diagram illustrating a Master-Slave communication system 300 suitable for implementing a Master or Slave device according to one embodiment of the present invention. The communication system 300 can be seen to include an antenna 302 coupled to a receiver 304 and a transmitter 306. The receiver 304 and transmitter 306 are further coupled to signal processing circuit 308. The signal processing circuit 308 preferably comprises appropriate A/D and D/A converters known to those skilled in the art of transforming analog and digital signals to digital and analog signals respectively. The signal processing circuit 308 further comprises a data processing device such as a microprocessor, micro-controller, CPU, DSP, or other like device and an interface system providing access to the data processing device such that data can be received and processed by the data processing device. The signal processing circuit 308 also includes the requisite algorithmic software to direct the processing of received and stored data by the data processing device necessary to implement the present Master-Slave Dwelling technique. One embodiment of a Master-Slave communication system 300 comprises a frequency synthesizer driven by the signal processing circuit 308 to generate the channel frequency maps used to implement the desired frequency hopping protocol during Master-Slave communications. The frequency synthesizer could be implemented as an independent device or as an integral portion of the signal processing circuit 308 such as depicted in FIG. 9, as well as in either the receiver 304 or the transmitter 306 portion of the system 300.

This invention has been described in considerable detail in order to provide those skilled in the wireless communication art with the information need to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, in a multiple Slave scenario, the Master can employ MSD for all the slaves with different MSD frequencies for different Slaves. Alternatively, the Master could use a mix of MSD for some Slaves and normal Bluetooth hopping for other Slaves. In the presence of multiple receive/transmit antennas at the Master, the Master can employ a mix of BMH/MSD/normal Bluetooth hopping for different Slaves, depending upon the different environments (Doppler speeds) for each Slave as illustrated in Table 3 above. Further, the Master and/or Slave(s) can employ a plurality of techniques to measure signal characteristics including, but not limited to, signal strength, correlation between transmitted and received signals, and signal retransmission properties, among others, that can be used to aid in the implementation of the present Master-Slave Dwelling technique.

What is claimed is:

1. A method for determining a Master-Slave frequency hopping sequence, the method comprising the steps of:
   during a frequency hopping sequence, scanning a plurality of frequency channels;
   measuring signal characteristics associated with each scanned channel, including monitoring whether data on a scanned channel has been requested by the Slave to be retransmitted by the Master;
   comparing the measured signal characteristics with predetermined signal characteristics to determine whether a channel demonstrates insufficient signal characteristics and further to determine which channels demonstrate acceptable signal characteristics; and
   without changing transmitted signal characteristics, causing communication between the Master and at least one Slave to dwell on a selected channel frequency for a predetermined period of time associated with a plurality of data packets, the selected channel frequency associated with a channel demonstrating acceptable signal characteristics, the dwell frequency displacing a channel frequency associated with a channel demonstrating insufficient signal characteristics; and
   After said predetermined period of time, resuming said frequency hopping sequence.

2. The method according to claim 1 wherein the step of measuring signal characteristics associated with each scanned channel comprises the step of measuring signal quality associated with a signal transmitted by the Slave and received by the Master.

3. The method according to claim 2 wherein the step of measuring signal quality comprises the step of measuring the strength of an analog signal transmitted by the Slave and received by the Master.

4. The method according to claim 2 wherein the step of measuring signal characteristics associated with each scanned channel further comprises the step of synchronizing a signal transmitted by the Slave with a signal received by the Master.

5. The method according to claim 4 wherein the step of measuring signal characteristics associated with each scanned channel further comprises the step of correlating the synchronized signals to determine a correlation coefficient.

6. The method according to claim 4 wherein the step of measuring signal characteristics associated with each scanned channel comprises the step of correlating a sync word associated with a packet transmitted by the Slave and received by the Master.

7. The method according to claim 4 wherein the step of measuring signal characteristics associated with each scanned channel comprises the step of correlating a packet header associated with a packet transmitted by the Slave and received by the Master.

8. The method according to claim 1 wherein the step of measuring signal characteristics associated with each scanned channel comprises the step of synchronizing a signal transmitted by the Slave with a signal received by the Master.

9. The method according to claim 8 wherein the step of measuring signal characteristics associated with each scanned channel comprises the step of correlating the synchronized signals to determine a correlation coefficient.

10. The method according to claim 1 wherein the step of comparing the measured signal characteristics with predetermined signal characteristics comprises the step of comparing a predetermined signal strength with a signal strength associated with the measured signal characteristics to determine if the measured signal characteristics are associated with a channel demonstrating acceptable signal characteristics.

11. The method according to claim 1 wherein the step of scanning a plurality of frequency channels comprises the step of scanning a plurality of Bluetooth frequency channels.

12. The method according to claim 1 wherein the step of comparing the measured signal characteristics with predetermined signal characteristics comprises the step of comparing whether a request to retransmit data occurs more than a predetermined number of times.

13. A method for determining a Master-Slave frequency hopping sequence, the method comprising the steps of:
during a frequency hopping sequence, scanning a plurality of frequency channels;
measuring signal characteristics associated with each scanned channel;
comparing the measured signal characteristics with predetermined signal characteristics to determine whether a channel demonstrates insufficient signal characteristics and further to determine which channels demonstrate acceptable signal characteristics; and
without changing transmitted signal characteristics, causing communication between the Master and at least one Slave to dwell on a selected channel frequency for a predetermined period of time associated with a plurality of data packets, the selected channel frequency associated with a channel demonstrating acceptable signal characteristics, the dwell frequency displacing a channel frequency associated with a channel demonstrating insufficient signal characteristics;
after said predetermined period of time, resuming said frequency hopping sequence; and
comparing the measured signal characteristics with the predetermined signal characteristics to determine whether signals at the dwell frequency associated with the predetermined period of time demonstrate insufficient signal characteristics and further to determine which channels demonstrate acceptable signal characteristics while the Master and at least one Slave dwell on the selected channel frequency.

14. The method according to claim 13 further comprising the step of causing communication between the Master and at least one Slave to return to a predetermined communication protocol established between the Master and the at least one Slave prior to the predetermined time period associated with the dwell frequency.

15. The method according to claim 14 wherein the step of causing communication between the Master and at least one Slave to return to a predetermined communication protocol comprises the step of causing communication between the Master and at least one Slave to return to a Bluetooth frequency hopping protocol.

16. A method for determining a Master-Slave Bluetooth frequency channel hopping sequence, the method comprising the steps of:
during a Bluetooth frequency hopping sequence, scanning a plurality of Bluetooth frequency channels;
measuring signal characteristics associated with each Bluetooth frequency channel, including monitoring whether a scanned channel has been requested by the Slave to be retransmitted by the Master;
generating control signals associated with the measured signal characteristics; and
without changing transmitted signal characteristics, controlling a frequency synthesizer via the control signals such that a Master and at least one Slave will dwell on a selected Bluetooth channel frequency for a predetermined period of time, the selected channel frequency associated with a channel demonstrating desirable signal characteristics, the selected Bluetooth channel frequency displacing a Bluetooth channel frequency exhibiting undesirable signal characteristics, wherein the predetermined period of time is associated with a plurality of data packets; and
after said predetermined period of time, resuming said frequency hopping sequence.

17. The method according to claim 16 wherein the step of measuring signal characteristics comprises the step of measuring a signal quality associated with each Bluetooth channel frequency.

18. The method according to claim 17 wherein the step of measuring a signal quality comprises the step of measuring the strength of a signal transmitted by the Slave and received by the Master.

19. The method according to claim 16 wherein the step of measuring signal characteristics comprises the step of correlating a transmitted signal associated with each Bluetooth channel frequency with a received signal associated with each Bluetooth channel frequency.

20. The method according to claim 16 wherein the step of monitoring whether a scanned channel has been used to retransmit a data packet by the Master in response to a request by the Slave comprises the step of monitoring whether a ARQN=0 bit has been transmitted by the Slave.

21. A method for controlling a Master-Slave frequency channel hopping sequence, the method comprising the steps of:
during a frequency channel hopping sequence, scanning a plurality of frequency channels;
measuring signal characteristics associated with each frequency channel;
generating control signals associated with the measured signal characteristics;
controlling a Master-Slave communication protocol via the control signals such that the communication protocol will alternate between a standard Bluetooth frequency channel hopping sequence and a modified Bluetooth hopping sequence, the modified Bluetooth hopping sequence determined from the measured signal characteristics;
comparing the measured signal characteristics with predetermined signal characteristics to determined whether a request to retransmit data between a Master and a Slave occurs more than a predetermined number of times; and
resuming said Bluetooth frequency hopping sequence after operation at said modified Bluetooth hopping sequence responsive to said measured signal characteristics.

22. The method according to claim 21 wherein the step of measuring signal characteristics comprises the step of measuring signal quality associated with a signal transmitted between a Slave and a Master.

23. The method according to claim 22 wherein the step of measuring signal characteristics further comprises the step of correlating a signal transmitted between a Slave and a Master.

24. The method according to claim 22 wherein the step of measuring signal quality comprises the step of measuring the strength of a signal transmitted by the Slave and received by the Master.

25. The method according to claim 21 wherein the step of measuring signal characteristics comprises the step of correlating a signal transmitted between a Slave and a Master.

26. A wireless communication system comprising:
a Master communication device configured to communicate with at least one Slave device via a predetermined communication protocol, comprising:
   a data processor;
   an algorithmic software directing the data processor; and
   a data storage unit, wherein discrete frequency channel data is stored and supplied to the data processor such that the data processor, directed by the algorithmic software, can automatically determine frequency channel parameters using algorithmically defined relationships among the discrete frequency channel data and thereby cause the Master communication device without changing transmitted signal characteristics to modify the predetermined Bluetooth communication protocol, the modified communication protocol comprising a modified Bluetooth protocol;
   the modified Bluetooth protocol rendering the Master communication device capable of dwelling on a desired channel frequency for at least two successive packets and the modified Bluetooth protocol further rendering the Master communication device capable of dwelling on a desired channel frequency such that the average time of occupancy on the desired channel frequency will be no more than 0.4 seconds within a 30 second time period; and
   after said time of occupancy, resuming said Bluetooth communication protocol.

27. The wireless communication system according to claim 26 further comprising at least one Slave device, wherein the Slave device comprises:
   a data processor;
   an algorithmic software directing the data processor; and
   a data storage unit, wherein discrete frequency channel data is stored and supplied to the data processor such that the data processor, directed by the algorithmic software, can automatically determine frequency channel parameters using algorithmically defined relationships among the discrete frequency channel data and thereby cause the Master communication device to modify the predetermined communication protocol.

28. The wireless communication system according to claim 26 wherein the predetermined communication protocol comprises a standard Bluetooth protocol.

29. The wireless communication system according to claim 26 wherein the discrete frequency channel data comprises signal strength data.

30. The wireless communication system according to claim 29 wherein the discrete frequency channel data further comprises signal correlation data.

31. The wireless communication system according to claim 26 wherein the discrete frequency channel data comprises signal retransmission data.

32. The wireless communication system according to claim 26 wherein the modified Bluetooth protocol further renders the Master communication device capable of ensuring all transmission frequencies are used equally on average over a predetermined time period.

33. A wireless communication system comprising:
a Master communication device configured to communicate with at least one Slave device via a predetermined communication protocol, comprising:
   a data processor;
   an algorithmic software directing the data processor; and
   a data storage unit storing and supplying discrete frequency channel data to the data processor, the data processor, under direction of the algorithmic software, automatically determining frequency channel parameters using algorithmically defined relationships among the discrete frequency channel data to cause the Master communication device to modify the predetermined communication protocol without changing transmitted signal characteristics; and
   the data processor, directed by the algorithmic software, further automatically determining frequency channel parameters during the modified communication protocol using algorithmically defined relationships among the discrete frequency channel data to cause the Master communication device to override the modified communication protocol and return to the predetermined communication protocol.

* * * * *